US009067239B2

(12) United States Patent
Chiou et al.

(10) Patent No.: US 9,067,239 B2
(45) Date of Patent: Jun. 30, 2015

(54) METHOD OF MAKING A PHASE DIFFERENCE FILM

(71) Applicant: FAR EASTERN NEW CENTURY CORPORATION, Taipei (TW)

(72) Inventors: Da-Ren Chiou, Taipei (TW); Wei-Che Hung, Taipei (TW); Yu-June Wu, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 190 days.

(21) Appl. No.: 13/769,077

(22) Filed: Feb. 15, 2013

(65) Prior Publication Data

US 2013/0342797 A1 Dec. 26, 2013

(30) Foreign Application Priority Data

Jun. 26, 2012 (TW) .............................. 101122811 A

(51) Int. Cl.
| | |
|---|---|
| G02F 1/1333 | (2006.01) |
| B05D 5/06 | (2006.01) |
| G02F 1/1335 | (2006.01) |
| G02B 5/30 | (2006.01) |
| G02B 27/26 | (2006.01) |

(52) U.S. Cl.
CPC ............. *B05D 5/06* (2013.01); *G02F 1/133528* (2013.01); *G02B 5/3016* (2013.01); *G02B 5/3083* (2013.01); *G02B 27/26* (2013.01)

(58) Field of Classification Search
CPC ..... G02F 1/133528; B05D 5/06; G02B 27/26
USPC .............. 349/92, 93, 94, 135, 129, 128, 110, 349/183, 187, 123, 88
See application file for complete search history.

(56) References Cited

U.S. PATENT DOCUMENTS

| | | | | |
|---|---|---|---|---|
| 5,633,060 | A * | 5/1997 | Tokuda et al. ................ | 428/64.1 |
| 8,488,098 | B2 * | 7/2013 | Akao et al. ..................... | 349/201 |
| 2007/0064308 | A1* | 3/2007 | Amemiya et al. ............ | 359/456 |
| 2008/0170192 | A1* | 7/2008 | Jeng .............................. | 349/128 |
| 2009/0268585 | A1* | 10/2009 | Tao et al. ................. | 369/112.16 |
| 2010/0216365 | A1* | 8/2010 | Song ............................... | 445/25 |
| 2011/0149208 | A1* | 6/2011 | Hoshi ............................. | 349/96 |
| 2011/0292327 | A1* | 12/2011 | Lin et al. ........................ | 349/113 |
| 2012/0021160 | A1* | 1/2012 | Kariyada ..................... | 428/64.4 |
| 2012/0307169 | A1* | 12/2012 | Ohyama et al. ................. | 349/33 |
| 2013/0192877 | A1* | 8/2013 | Furuta et al. .................. | 174/250 |
| 2013/0215340 | A1* | 8/2013 | Su et al. .......................... | 349/15 |

\* cited by examiner

*Primary Examiner* — Sang V Nguyen
(74) *Attorney, Agent, or Firm* — Holland & Hart, LLP

(57) ABSTRACT

A method of making a phase difference film includes: (a) providing a substrate having a first surface provided with a light-shielding layer and a second surface provided with an orientable layer; (b) providing a first linear polarized UV light to irradiate the orientable layer and providing a second linear polarized UV light to irradiate the orientable layer so as to form the orientable layer into an alignment layer having first and second regions that are photo-oriented in two different orientation directions, respectively; and (c) coating a liquid crystal material on the alignment layer and curing the liquid crystal material.

18 Claims, 8 Drawing Sheets

METHOD OF MAKING A PHASE DIFFERENCE FILM

CROSS-REFERENCE TO RELATED APPLICATION

This application claims priority of Taiwanese Application no. 101122811, filed on Jun. 26, 2012.

BACKGROUND OF THE INVENTION

1. Field of the Invention

The present invention relates to a method of making a phase difference film, more particularly to a method of making a phase difference film having two orientation directions.

2. Description of the Related Art

Three dimensional (3D) displays can be classified into glasses-type 3D displays and glasses-free-type 3D displays. Although the glasses-free-type 3D displays do not require the use of glasses for viewing images on the 3D displays, they have disadvantages, such as low resolution, low brightness, and a narrow viewing angle, which are difficult to solve.

The glasses used for viewing images on the glasses-type 3D displays provide a wide viewing angle. Among the aforementioned glasses, polarized glasses are more popular due to their low manufacturing costs and light weight. In addition, the polarized glasses can improve upon the flicker problem that shutter glasses have.

The polarized glasses use a film having a patterned polarizer or a phase difference film for changing the polarization directions of the left and right eye images before providing the left and right eye images to the left and right eyes of the viewer, thereby creating a 3D image viewing effect.

European Patent No. EP 0887667 discloses a method of making a patterned retarder (which can also be called as a phase difference film). The method involves plural rubbings of an alignment layer to form an aligning pattern having different orientation directions on the alignment layer. However, there exists an electrostatic problem during the rubbing operation (due to generation of charged particles). In addition, the method requires the use of complicated photolithography techniques, which involve an extraordinarily high precision operation and can result in a poor yield problem.

Other conventional methods of making a phase difference film include one that uses photo alignment techniques. In this method, two patterned hard masks (quartz masks) are used for shielding different regions of a liquid crystal material layer during two consecutive irradiating operations that use two different polarized lights, respectively. Although the method can overcome the aforementioned electrostatic problem, it requires the use of the hard masks, which hinders the use of the roll to roll processing in the manufacturing of the phase difference film and which has a light scattering problem that results in a need to incorporate a parallel light source for obtaining a precise structural pattern on the liquid crystal material layer. The method has disadvantages, such as having high manufacturing costs and hard to irradiate a large size liquid crystal material layer and to achieve mass production.

SUMMARY OF THE INVENTION

Therefore, the object of the present invention is to provide a method of making a phase difference film that can overcome the aforementioned drawbacks associated with the prior art.

According to this invention, there is provided a method of making a phase difference film. The method comprises: (a) providing a first light-transmissible substrate having opposite first and second surfaces, the first surface being formed with a patterned light-shielding layer thereon, the second surface being formed with an orientable layer of a photo-orientable material thereon; (b) providing a first linear polarized UV light that is directed from one side of the first light-transmissible substrate, at which the patterned light-shielding layer is disposed, through the first light-transmissible substrate to an opposite side of the first light-transmissible substrate, at which the orientable layer is disposed, to irradiate the orientable layer, and providing a second linear polarized UV light that is directed from said opposite side of the first light-transmissible substrate to said one side of the first light-transmissible substrate to irradiate the orientable layer so as to form the orientable layer of the photo-orientable material into an alignment layer having first and second regions that are photo-oriented in two different orientation directions, respectively; and (c) coating a liquid crystal material on the alignment layer and curing the liquid crystal material so as to form the liquid crystal material into a phase difference film having first and second regions that are aligned in the first and second orientation directions, respectively.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
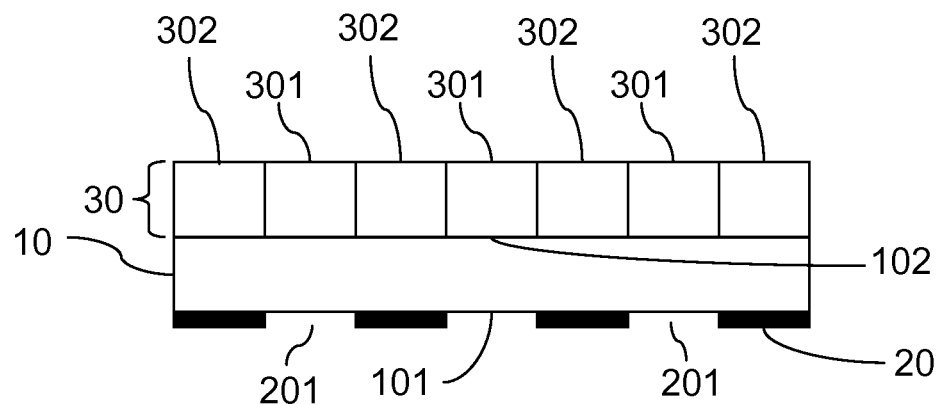
FIGS. 1 to 7 are schematic views illustrating consecutive steps of the first preferred embodiment of a method of making a phase difference film according to the present invention.
Figure 2:
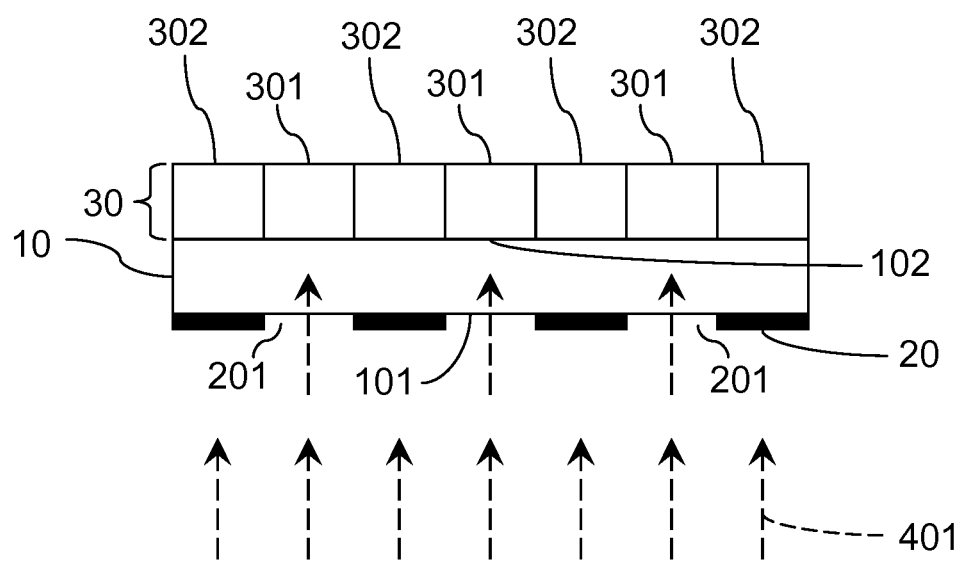
Figure 3:
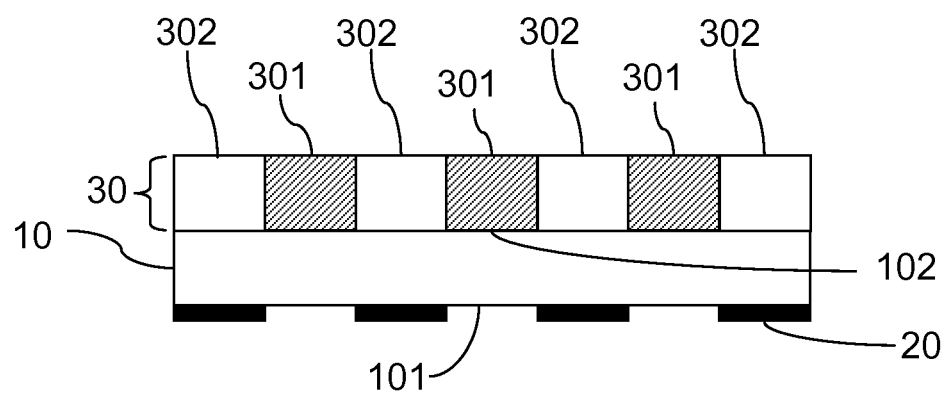
Figure 4:
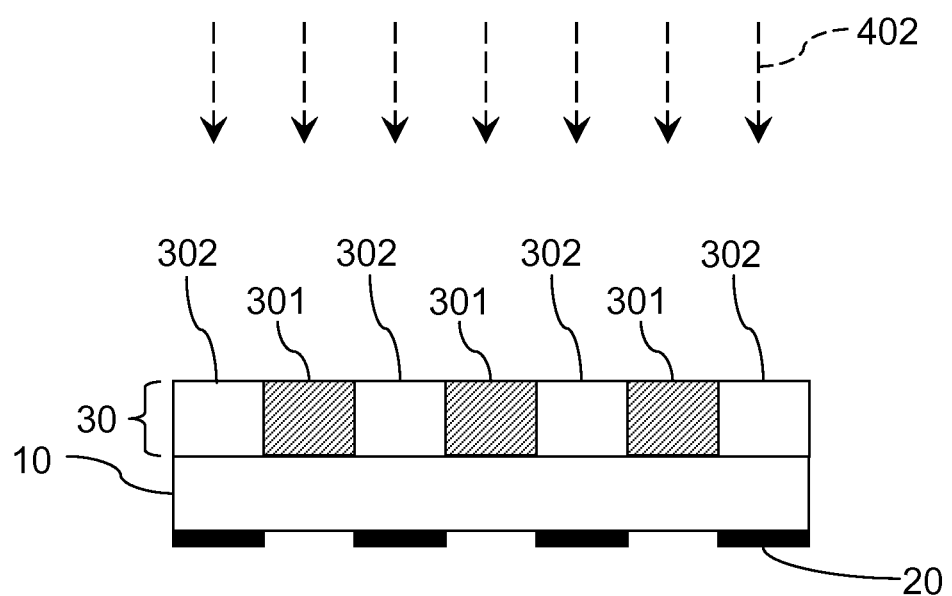

Before the present invention is described in greater detail with reference to the accompanying preferred embodiments, it should be noted herein that like elements are denoted by the same reference numerals throughout the disclosure.

FIGS. 1 to 7 illustrate the first preferred embodiment of a method of making a phase difference film according to the present invention. The method includes the steps of: providing a first light-transmissible substrate 10 having opposite first and second surfaces 101, 102, the first surface 101 being formed with a patterned light-shielding layer 20 thereon, the second surface 102 being formed with an orientable layer 30 of a photo-orientable material thereon (see FIG. 1), the patterned light-shielding layer 20 defining a plurality of holes 201 that are arranged in an array for exposing first regions 301 of the orientable layer 30 to a first linear polarized UV light in the subsequent step, and shielding a plurality of second regions 302 of the orientable layer 30, the second regions 302 being alternately disposed with the first regions 301; providing a first linear polarized UV light 401 that is directed from one side of the first light-transmissible substrate 10, at which the patterned light-shielding layer 20 is disposed, through the holes 201 in the patterned light-shielding layer 20 and the first light-transmissible substrate 10 to an opposite side of the first light-transmissible substrate 10, at which the orientable layer 30 is disposed, to irradiate only the first regions 301 of the orientable layer 30 (see FIG. 2) for a first irradiation dosage (a quantity of irradiation energy accumulated during the irradiation) such that only the photo-orientable material of the first regions 301 is oriented in a first orientation direction (see FIG. 3), followed by providing a second linear polarized UV light 402 that is directed from said opposite side of the first light-transmissible substrate 10 to said one side of the first light-transmissible substrate 10 to irradiate the entire orientable layer 30 (i.e., the first and second regions 301, 302) (see FIG. 4) for a second irradiation dosage in such a manner that only the photo-orientable material of the second regions 302 is oriented in a second orientation direction (it is noted that the first orientation of the photo-orientable material of the first regions 301 can remain unchanged as long as the second irradiation dosage is less than the first irradiation dosage) so as to form the orientable layer 30 into an alignment layer 32 (see FIG. 5) having the first and second regions 301, 302 that are photo-oriented in the first and second orientation directions, respectively; and coating a liquid crystal material 50 on the alignment layer 32 and curing the liquid crystal material 50 with a non-linear polarized UV light 60 (see FIG. 6) so as to form the liquid crystal material 50 into a phase difference film 52 (see FIG. 7) having first and second regions 521, 522 that are aligned by the first and second regions 301, 302 of the alignment layer 32 in the first and second orientation directions, respectively.

The first light-transmissible substrate 10 is preferably flexible, and is made from a material selected from, but not limited to, polyester resin, acetic ester resin, polyethersulfone resin, polycarbonate resin, polyamide resin, polyimide resin, polyolefin resin, acrylic resin, polyvinyl chloride resin, polystyrene resin, polyvinyl alcohol resin, polyaromatic ester resin, polyphenylene sulfide resin, polyvinylidene chloride resin, and methylacrylic resin. Preferably, the first light-transmissible substrate 10 is made from cellulose triacetate or polycarbonate resin.

The patterned light-shielding layer 20 can be formed by conventional techniques, such as coating, deposition and printing techniques. In this embodiment, the patterned light-shielding layer 20 is printed on the first surface 101 of the first light-transmissible substrate 10. The patterned light-shielding layer 20 is made from a shielding material that is capable of absorbing or reflecting light of a particular range of wavelengths. In this embodiment, the shielding material of the patterned light-shielding layer 20 includes a UV radiation absorbing agent and a light-shielding ink.

Examples of the UV radiation absorbing agent include, but are not limited to, benzophenone and benzotriazole.

Examples of the light-shielding ink include, but are not limited to, carbon black ink, graphite ink, azo dye ink and phthalocyanine ink.

Examples of the printing of the patterned light-shielding layer 20 include, but are not limited to, screen printing, gravure printing, and spraying.

The light transmissibility of the patterned light-shielding layer 20 is defined as the fraction or percentage of the intensity of a wavelength range of an incident light passing through the patterned light-shielding layer 20. Preferably, the patterned light-shielding layer 20 has a light transmissibility less than 20%, more preferably less than 15%, and most preferably less than 10%. The light transmissibility of the patterned light-shielding layer 20 can be adjusted by controlling the concentrations of the UV radiation absorbing agent and the light-shielding ink.

The photo-orientable material can be classified by reaction mechanism into three different types of materials: photo-induced isomerization material, photo-induced cross-linking material, and photo-induced cracking material. Preferably, the photo-orientable material employed in the method of this invention is the photo-induced cross-linking material.

Examples of the photo-induced cross-linking material include, but are not limited to, cinnamate derivatives, benzylidene acetophenone derivatives, maleimide derivatives, quinolinone derivatives, bis(benzylidene) derivatives and coumarin derivatives.

Formation of the orientable layer 30 of the photo-orientable material can be conducted by, but is not limited to, spin coating, bar coating, dip coating, slot coating, screen printing, or gravure printing.

As an example, when a layer of the photo-induced cross-linking material is exposed to a linear polarized UV light, the molecules of the photo-induced cross-linking material can be activated to orient along an alignment direction and undergo a cross-linking reaction so as to form the layer with an aligned topological structure. When the liquid crystal material is applied to the aligned topological structure, molecules of the liquid crystal material can be aligned by the topological structure along the alignment direction.

In this embodiment, the irradiation of the first regions 301 of the orientable layer 30 with the first linear polarized UV light 401 is conducted before the irradiation of the second regions 302 of the orientable layer 30 with the second linear polarized UV light 402, and the first irradiation dosage of the first linear polarized UV light 401 is higher than the second irradiation dosage of the second linear polarized UV light 402 so as to ensure that the first orientation of the photo-orientable material of the first regions 301 can remain unchanged after the subsequent irradiation of the second linear polarized UV light 402. Since a high irradiation dosage requires a longer exposure time, which results in an adverse effect on the roll-to-roll processing and an increase in energy consumption and the manufacturing costs, the irradiation dosage of the first linear polarized UV light 401 is preferably not greater than 500 mJ/cm$^2$.

The irradiation dosage of the second linear polarized UV light 402 depends on the types of irradiation equipments and the types of the photo-orientable materials used. As an example, the irradiation dosage of the second linear polarized UV light 402 is preferably not less than 5 mJ/cm$^2$ when the photo-induced cross-linking material is used.

Application of the liquid crystal material to the alignment layer 32 can be conducted by, but is not limited to, spin coating, bar coating, dip coating, slot coating, or roll-to-roll coating.

The liquid crystal material employed in this invention can be, but is not limited to, a photo-induced cross-linking type liquid crystal material.

In this embodiment, the curing of the liquid crystal material is conducted by irradiating the liquid crystal material with a non-polarized UV light.

Figure 5:
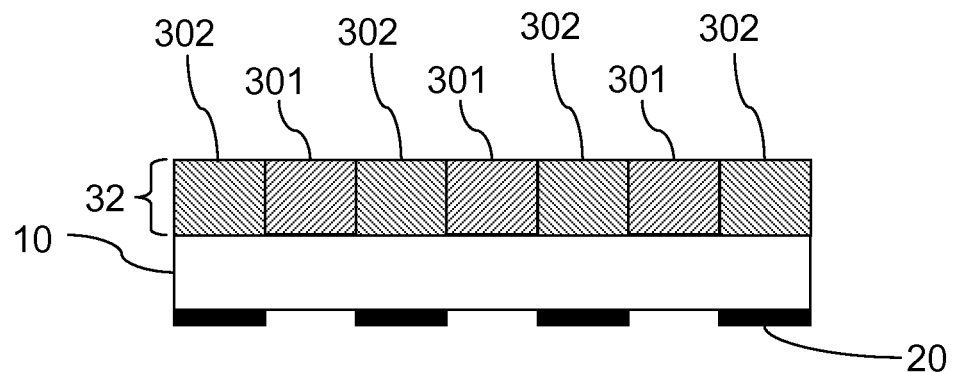
Figure 6:
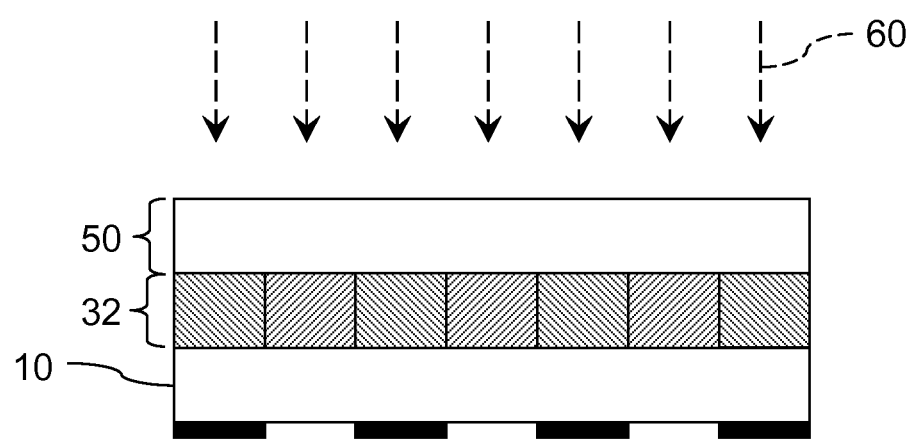
Figure 7:
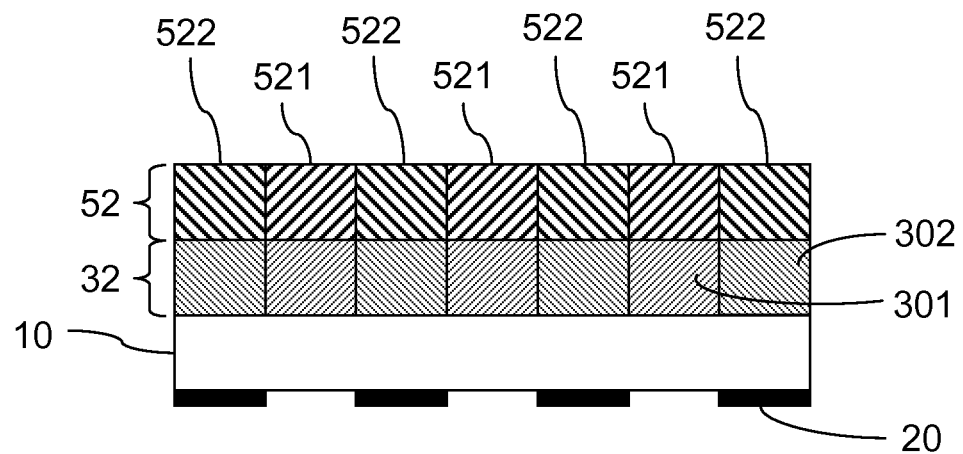
Figure 8:
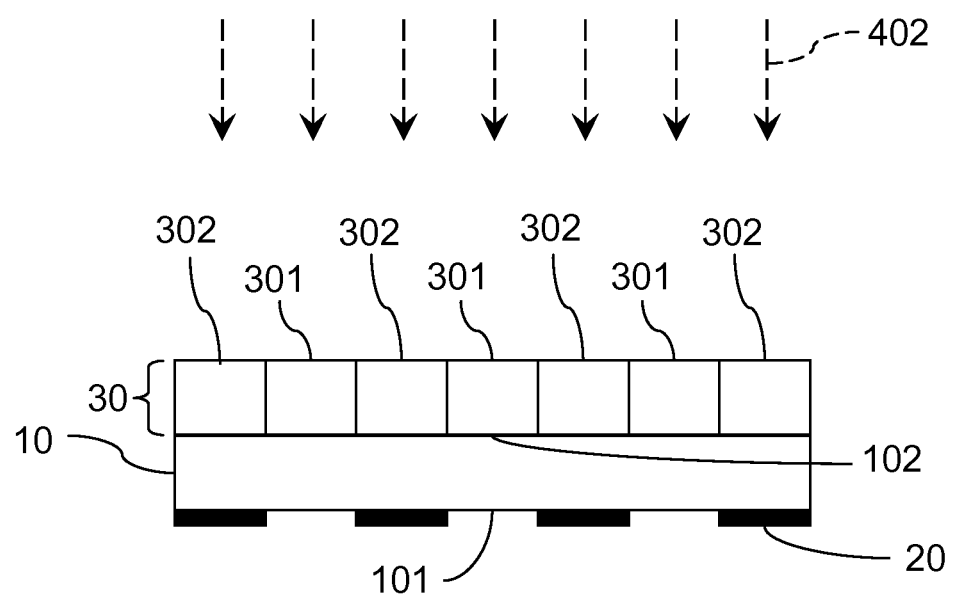
FIGS. 8 to 10 are schematic views illustrating consecutive steps of the second preferred embodiment of the method of making an alignment layer of the phase difference film according to the present invention.
Figure 9:
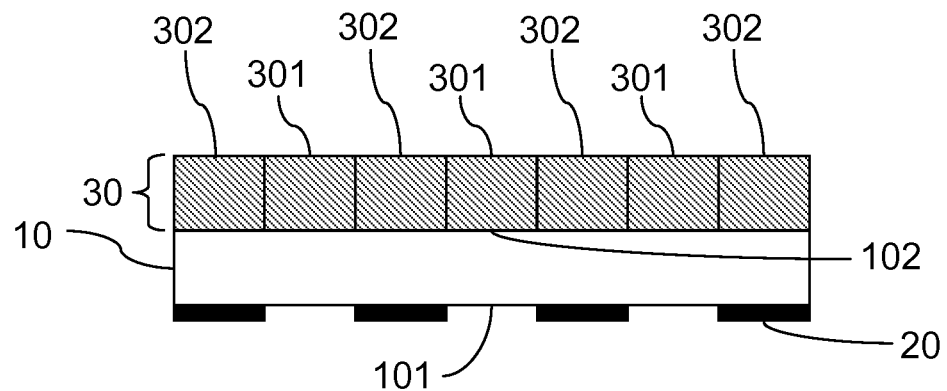
Figure 10:
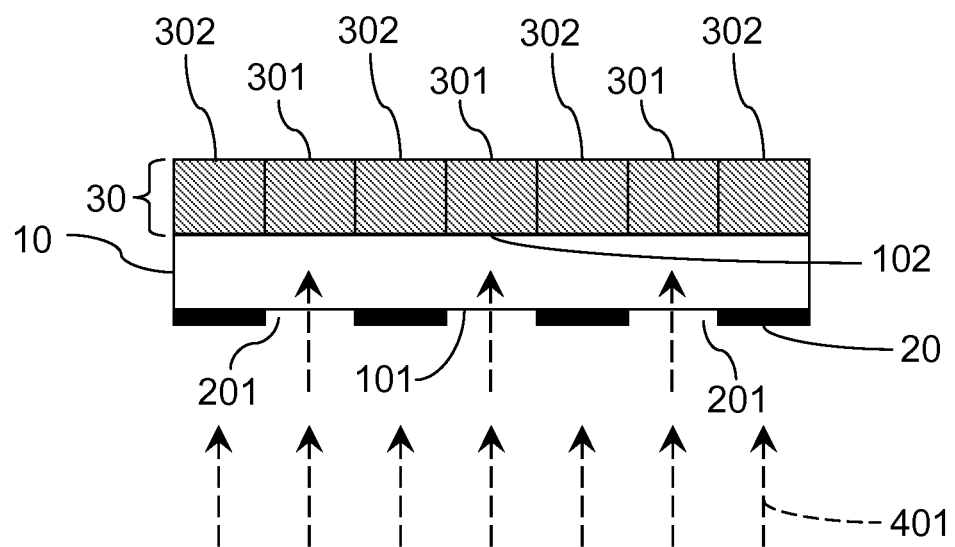

FIGS. 8 to 10, in combination with FIGS. 5 to 7, illustrate the second preferred embodiment of the method of making the phase difference film according to the present invention. The second preferred embodiment differs from the previous embodiment in that the second linear polarized UV light 402 is directed from said opposite side of the first light-transmissible substrate 10 to said one side of the first light-transmissible substrate 10 to irradiate the entire orientable layer 30 (see FIG. 8) such that the photo-orientable material of the first and second regions 301, 302 is oriented in the second orientation direction (see FIG. 9), followed by directing the first linear polarized UV light 401 from said one side of the first light-transmissible substrate 10 through the holes 201 and the first light-transmissible substrate 10 to said opposite side of the first light-transmissible substrate 10 to irradiate only the first regions 301 of the orientable layer 30 (see FIG. 10) such that only the photo-orientable material of the first regions 301 is reoriented from the second orientation direction to the first orientation direction (see FIG. 5). In order to reorient the photo-orientable material of the first regions 301 from the second orientation direction to the first orientation direction, the irradiation dosage of the first linear polarized UV light 401 is required to be not smaller than that of the second linear polarized UV light 402.

The polarization direction of the first linear polarized UV light 401 and the polarization direction of the second linear polarized UV light 402 are preferably perpendicular to each other so as to obtain a phase difference film 52 with a better viewing effect.

The first light-transmissible substrate 10 is preferably stretched in such a manner that it has a birefringent property, i.e., exhibits a retardation ($R_o$). The retardation ($R_o$) of a material is defined as the product of the birefringence ($\Delta n$) and the layer thickness (d) of the material. Hence, the retardation of the material can be controlled through adjustment in the birefringence ($\Delta n$) and the layer thickness (d) of the material.

When a light-transmissible substrate has a relatively high retardation ($R_o$), by passing through the light-transmissible substrate, the polarization direction of a linear polarized light can be changed into a non-linear polarized light (i.e., a circular polarized light), which does not have the function of orienting the photo-orientable material. Hence, the first light-transmissible substrate 10 preferably has a low retardation ($R_o$) to prevent the change of the polarization direction from occurring. A suitable value of the retardation ($R_o$) of the first light-transmissible substrate 10 depends on the following conditions. When a slow axis of the first light-transmissible substrate 10 forms an angle of zero degree or 90 degrees with a polarization direction of the first linear polarized UV light, the first light-transmissible substrate 10 preferably has a retardation ($R_o$) less than 300 nm, and when the slow axis of the first light-transmissible substrate 10 forms an angle of 45 degrees with a polarizing direction of the first linear polarized UV light, the first light-transmissible substrate 10 preferably has a retardation ($R_o$) less than 100 nm.

In another preferred embodiment, the method of this invention further includes the step of removing the patterned light-shielding layer 20 from the first light-transmissible substrate 10 after formation of the phase difference film 52. Removal of the patterned light-shielding layer 20 from the first light-transmissible substrate 10 can be accomplished by the use of a solvent or a blade.

Figure 11:
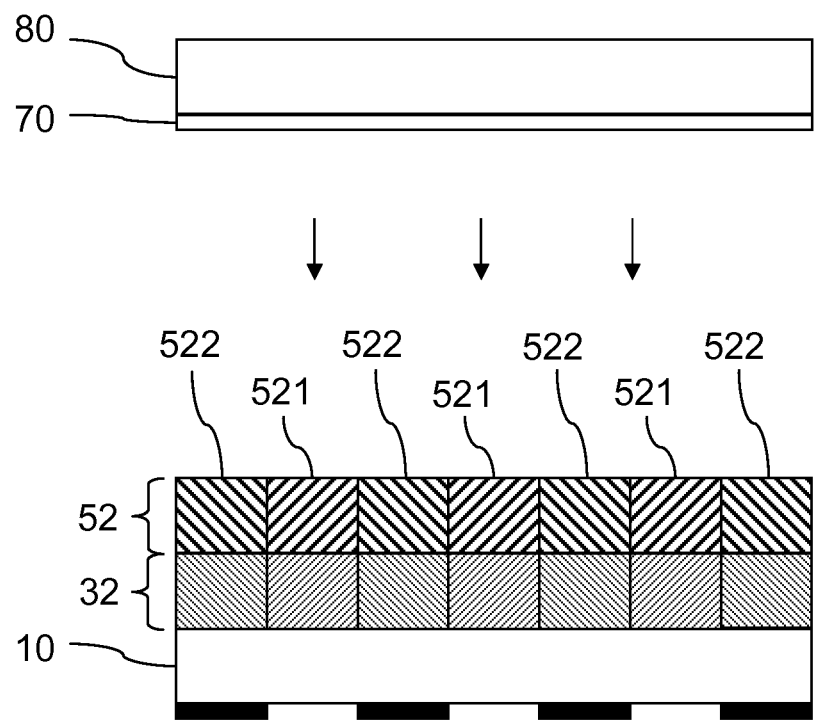
FIGS. 11 to 13 are schematic views illustrating consecutive steps of a transferring method of transferring a phase difference film of this invention from a substrate to another substrate.
Figure 12:
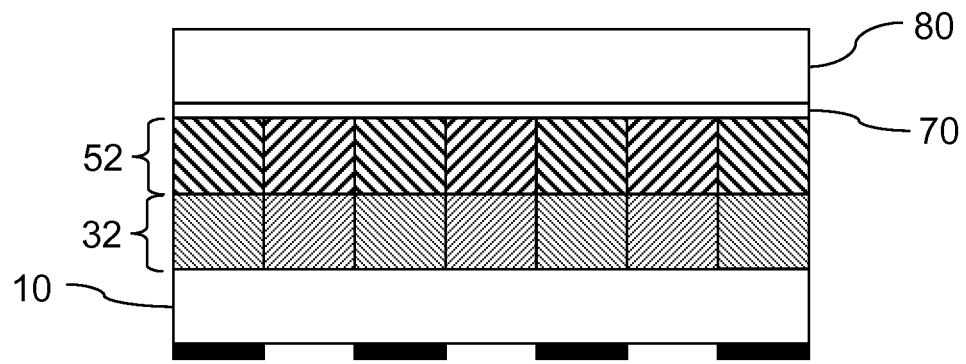
Figure 13:
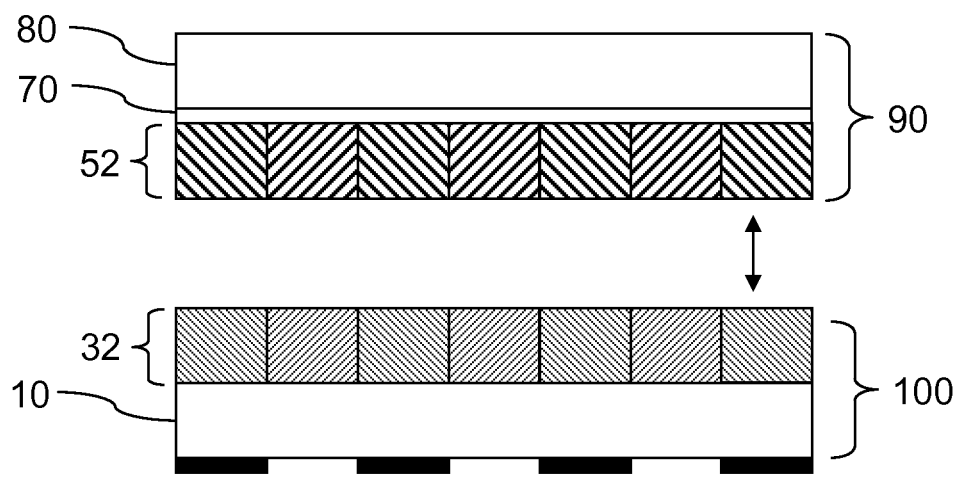

FIGS. 11 to 13 are consecutive steps of a transferring method illustrating how the phase difference film 52 on the alignment layer 32 on the first light-transmissible substrate 10 of FIG. 7 is transferred from the first light-transmissible substrate 10 to a second light-transmissible substrate 80. The transferring method includes the steps of applying a pressure sensitive adhesive layer 70 to the second light-transmissible substrate 80 (see FIG. 11), attaching the pressure sensitive adhesive layer 70 together with the second light-transmissible substrate 80 to the phase difference film 52 (see FIG. 12), and peeling off the phase difference film 52 together with the pressure sensitive adhesive layer 70 and the second light-transmissible substrate 80 from the alignment layer 32 so as to obtain a phase difference layered structure 90 and a substrate layered structure 100 (see FIG. 13). The phase difference layered structure 90 includes the phase difference film 52, the pressure sensitive adhesive layer 70 and the second light-transmissible substrate 80. The substrate layered structure 100 includes the first light-transmissible substrate 10 and the alignment layer 32, and can be reused for formation of the phase difference film 52.

Application of the pressure sensitive adhesive layer 70 can be conducted by spin coating, bar coating, or slot coating.

The pressure sensitive adhesive layer 70 is made from an adhesive selected from acrylic acid-based pressure sensitive adhesive, urethane-based pressure sensitive adhesive, (styrene-butadiene-rubber)-based pressure sensitive adhesive, polyisobutene-based pressure sensitive adhesive, polyvinyl ether-based pressure sensitive adhesive, epoxy-based pressure sensitive adhesive, melamine-based pressure sensitive adhesive, polyester-based pressure sensitive adhesive, phenol-based pressure sensitive adhesive and silicone-based pressure sensitive adhesive.

The following examples and comparative examples are provided to illustrate the preferred embodiments of the invention, and should not be construed as limiting the scope of the invention.

Example 1

Preparation of a Photo-Orientable Material 1.75 g of methylethylketone and 1.75 g of cyclopentanone were mixed to form a solvent mixture. 0.5 g of a cinnamate resin (a photo-induced cross-linking type photo-orientable material, available from Swiss Rolic Co., catalogue no.: ROP103, having a solid content of 10%) was dissolved in the solvent mixture to obtain a photo-orientable slurry (A1).

Preparation of a Liquid Crystal Material 1 g of a liquid crystal polymer (available from BASF, catalogue no.: LC242) was added in 4 g of cyclopentanone to obtain a liquid crystal material (A2) with a solid content of 20%.

Preparation of a Pressure Sensitive Adhesive Layer on a Substrate 10 g of acrylic acid-based pressure sensitive adhesive material (having a solid content of 10%) was applied to a cellulose triacetate substrate using bar coating techniques, followed by baking the acrylic acid-based pressure sensitive adhesive material in an oven under 100° C. and cooling to form a pressure sensitive adhesive layer (A3) having a layer thickness of 20 μm and a peel strength of 200 gf/25 mm on the cellulose triacetate substrate.

Preparation of a Phase Difference Film 5 g of a binder (a thermosetting resin) and 5 g of toluene were mixed to form a solution. 0.2 g of a UV absorbing agent (available from Everlight Chem. Co., catalogue no.: Eversorb51) was added into the solution to form an ink material (the weight ratio of the UV absorbing agent to the binder was equal to 1:25). The ink material was applied in a predetermined pattern to a first surface of a polycarbonate substrate having a thickness of 60 μm, a birefringence of $2.17 \times 10^{-4}$ and a retardation of 13 nm using gravure printing techniques, followed by baking the ink material in an oven under 60° C. for 30 seconds so as to form a patterned light-shielding layer, defining a plurality of holes and having a layer thickness of 1

μm and a light transmissibility of 10%, on the polycarbonate substrate. About 4 g of the photo-orientable slurry (A1) was applied to a second surface of the polycarbonate substrate opposite to the first surface using spin coating techniques (speed: 3000 rpm for 40 seconds), followed by baking the photo-orientable slurry (A1) in an oven under 100° C. for two minutes and then cooling so as to form an orientable layer of a photo-orientable material, having first regions aligned with the holes and second regions misaligned with the holes, on the polycarbonate substrate. A first linear polarized UV light with a polarization direction forming a zero degree angle with a slow axis of the polycarbonate substrate was provided and was directed from a first side of the polycarbonate substrate (at which the patterned light-shielding layer was disposed) through the holes defined by the patterned light-shielding layer and the polycarbonate substrate to a second side of the polycarbonate substrate (at which the photo-orientable material was disposed) to irradiate only the first regions of the orientable layer. The irradiation dosage of the first linear polarized UV light was 180 mJ/cm$^2$. A second linear polarized UV light with a polarization direction forming a 90 degree angle with the slow axis of the polycarbonate substrate was provided and was directed from the second side to the first side of the polycarbonate substrate to irradiate the entire orientable layer (i.e., the first and second regions) so as to form the orientable layer into an alignment layer. The irradiation dosage of the second linear polarized UV light was 90 mJ/cm$^2$. About 5 g of the liquid crystal material (A2) was applied to the alignment layer using spin coating techniques (speed: 3000 rpm for 40 seconds) to allow alignment of the liquid crystal material by the alignment layer to take place, followed by baking in an oven under 60° C. for five minutes and then cooling so as to form the liquid crystal material into an aligned liquid crystal layer. The aligned liquid crystal layer thus formed was cured by irradiation with a non-linear polarized UV light so as to form the liquid crystal layer into a phase difference film on the alignment layer. The irradiation dosage of the non-linear polarized UV light was 120 mJ/cm$^2$.

Example 2

The operating procedures and conditions of Example 2 were similar to those of Example 1 except for the birefringence of the polycarbonate substrate. The polycarbonate substrate of Example 2 has a birefringence ($\Delta n$) of $4.5 \times 10^{-3}$ and a retardation ($R_0$) of 270 nm.

Example 3

The operating procedures and conditions of Example 3 were similar to those of Example 1 except for the birefringence of the polycarbonate substrate. The polycarbonate substrate of Example 3 has a birefringence ($\Delta n$) of $1.33 \times 10^{-3}$ and a retardation ($R_0$) of 80 nm.

Example 4

The operating procedures and conditions of Example 4 were similar to those of Example 3 except for the polarization directions of the first and second linear polarized UV lights. In Example 4, the polarization direction of the first linear polarized UV light forms a +45 degree angle with the slow axis of the polycarbonate substrate, and the polarization direction of the second linear polarized UV light forms a −45 degree angle with the slow axis of the polycarbonate substrate.

Comparative Example 1

The operating procedures and conditions of Comparative Example 1 were similar to those of Example 1 except for the birefringence of the polycarbonate substrate. The polycarbonate substrate of Comparative Example 1 has a birefringence ($\Delta n$) of $5.0 \times 10^{-3}$ and a retardation ($R_0$) of 300 nm.

Comparative Example 2

The operating procedures and conditions of Comparative Example 2 were similar to those of Example 4 except for the birefringence of the polycarbonate substrate. The polycarbonate substrate of Comparative Example 2 has a birefringence ($\Delta n$) of $1.67 \times 10^{-3}$ and a retardation ($R_0$) of 100 nm.

Example 5

The operating procedures and conditions of Example 5 were similar to those of Example 1 except for the irradiating order of the first and second linear polarized UV lights and the irradiation dosage of the first linear polarized UV light. In Example 5, the second linear polarized UV light was directed from the second side to the first side of the polycarbonate substrate in an irradiation dosage of 90 mJ/cm$^2$, followed by directing the first linear polarized UV light from the first side to the second side of the polycarbonate substrate in an irradiation dosage of 90 mJ/cm$^2$.

Example 6

The operating procedures and conditions of Example 6 were similar to those of Example 5 except for the birefringence of the polycarbonate substrate. The polycarbonate substrate of Example 6 has a birefringence ($\Delta n$) of $4.5 \times 10^{-3}$ and a retardation ($R_0$) of 270 nm.

Example 7

The operating procedures and conditions of Example 7 were similar to those of Example 5 except for the birefringence of the polycarbonate substrate. The polycarbonate substrate of Example 6 has a birefringence ($\Delta n$) of $1.33 \times 10^{-3}$ and a retardation ($R_0$) of 80 nm.

Example 8

The operating procedures and conditions of Example 8 were similar to those of Example 7 except for the polarization directions of the first and second linear polarized UV lights. In Example 8, the polarization direction of the first linear polarized UV light forms a +45 degree angle with the slow axis of the polycarbonate substrate, and the polarization direction of the second linear polarized UV light forms a −45 degree angle with the slow axis of the polycarbonate substrate.

Comparative Example 3

The operating procedures and conditions of Comparative Example 3 were similar to those of Example 5 except for the birefringence of the polycarbonate substrate. The polycarbonate substrate of Comparative Example 3 has a birefringence ($\Delta n$) of $5.0 \times 10^{-3}$ and a retardation ($R_0$) of 300 nm.

Comparative Example 4

The operating procedures and conditions of Comparative Example 4 were similar to those of Example 8 except for the birefringence of the polycarbonate substrate. The polycarbonate substrate of Comparative Example 4 has a birefringence (Δn) of $1.67 \times 10^{-3}$ and a retardation ($R_o$) of 100 nm.

The alignment direction(s) of each of the phase difference films of Examples 1 to 8 and Comparative Examples 1 to 4 aligned by the alignment layer was measured by the use of a phase retardation analyzer (catalogue no.: KOBRA-CCD, manufactured by Oji Scientific Instruments). The measured results are shown in Table 1.

TABLE 1

| | Retardation of polycarbonate substrate, (nm) | Angle between A1* and A2# | Number of alignment direction(s) of the phase difference film |
|---|---|---|---|
| Example 1 | 13 | 0° | 2 |
| Example 2 | 270 | 0° | 2 |
| Example 3 | 80 | 0° | 2 |
| Example 4 | 80 | +45° | 2 |
| Example 5 | 13 | 0° | 2 |
| Example 6 | 270 | 0° | 2 |
| Example 7 | 80 | 0° | 2 |
| Example 8 | 80 | +45° | 2 |
| Comparative Example 1 | 300 | 0° | 1 |
| Comparative Example 2 | 100 | +45° | 1 |
| Comparative Example 3 | 300 | 0° | 1 |
| Comparative Example 4 | 100 | +45° | 1 |

*A1 represents the polarization direction of the first linear polarized UV light.
A2 represents the slow axis of the polycarbonate substrate.

The measured results of Examples 1 to 4 show that the phase difference film of each of Examples 1 to 4 is aligned in two different directions by the alignment layer, which demonstrates that the photo-orientable material of the first regions of the orientable layer is oriented in a first orientation direction by the first linear polarized UV light, that the photo-orientable material of the second regions of the orientable layer is oriented in a second orientation direction by the second linear polarized UV light, and that the first orientation of the first regions remains unchanged during irradiation of the second linear polarized UV light.

Figure 14:
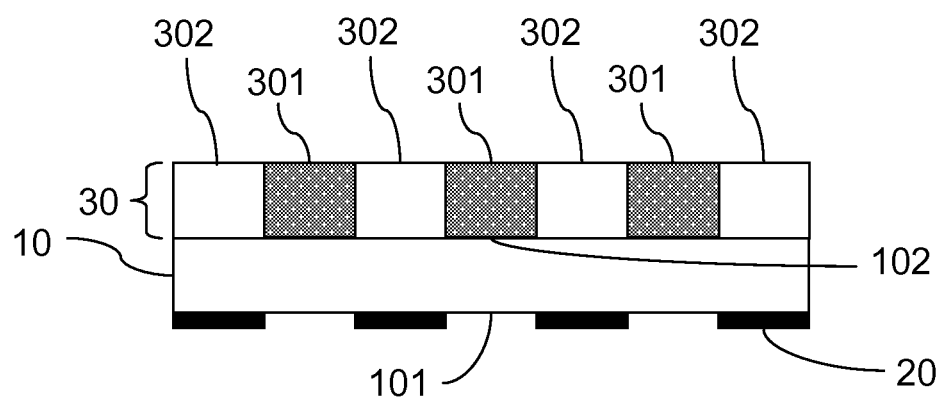
FIG. 14 is a schematic view illustrating a state in which an orientable layer of a photo-orientable material is irradiated with a non-linear polarized UV light in Comparative Example 4.
Figure 15:
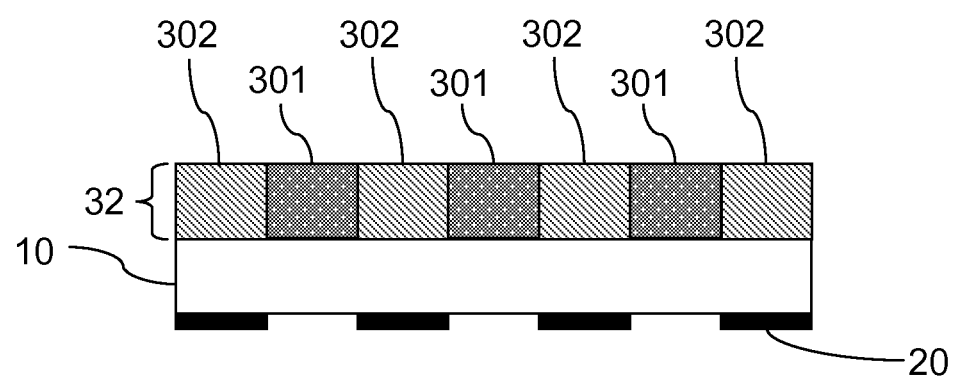
FIG. 15 is a schematic view illustrating a state in which the orientable layer of the photo-orientable material of FIG. 14 is further irradiated with a linear polarized UV light in Comparative Example 4.

The measured results of Comparative Example 1 show that the phase difference film thereof is aligned in solely one direction by the alignment layer, which demonstrates that only the photo-orientable material of the second regions of the orientable layer is oriented in the second orientation direction. The measured results of Comparative Example 1 can be attributed to the following reasons. Since the retardation of the polycarbonate substrate of Comparative Example 1 is too high (300 nm) under a zero degree angle between A1 and A2 (see Table 1), the first linear polarized UV light directed from the first side to the second side of the polycarbonate substrate is undesirably converted into a non-linear polarized UV light (i.e., a circular polarized UV light that does not exhibit an orienting function to the photo-orientable material) after passing through the polycarbonate substrate. As a consequence, the photo-orientable material of the first regions of the orientable layer cannot be oriented by the non-linear polarized UV light but are cured by the non-linear polarized UV light (see FIG. 14, the reference numeral 301 in FIG. 14 denotes the first regions which are under a cured state). In addition, since the second regions of the orientable layer are prevented from the irradiation of the non-linear polarized UV light by the blocking of the patterned light-shielding layer, they remain unchanged during the irradiation of the first linear polarized UV light and are oriented in the second orientation direction (see FIG. 15, the reference numeral 302 in FIG. 15 denotes the second regions which are under an oriented state) after the irradiation of the second linear polarized UV light. It is noted that since the irradiation dosage of the second linear polarized UV light in Comparative Example 1 is less than that of the first linear polarized UV light and since the photo-orientable material of the first regions has been cured, the photo-orientable material of the first regions cannot be oriented by the second linear polarized UV light.

In a similar manner, since the retardation of the polycarbonate substrate of Comparative Example 2 is too high (100 nm) under a +45 degree angle between A1 and A2 (see Table 1), the first linear polarized UV light directed from the first side to the second side of the polycarbonate substrate is undesirably converted into a non-linear polarized UV light after passing through the polycarbonate substrate.

The measured results of Examples 5 to 8 show that the phase difference film of each of Examples 5 to 8 is aligned in two different directions by the alignment layer, which demonstrates that the photo-orientable material of the first and second regions of the orientable layer is oriented in the second orientation direction by the second linear polarized UV light, that the photo-orientable material of the first regions of the orientable layer is subsequently reoriented from the second orientation direction to the first orientation direction by the first linear polarized UV light, and that the second orientation of the second regions remains unchanged during irradiation of the first linear polarized UV light.

The measured results of Comparative Example 3 show that the phase difference film is aligned in solely one direction by the alignment layer. Since the retardation of the polycarbonate substrate of Comparative Example 3 is too high (300 nm) under a zero degree angle between A1 and A2 (see Table 1), the first linear polarized UV light directed from the first side to the second side of the polycarbonate substrate is undesirably converted into a non-linear polarized UV light after passing through the polycarbonate substrate. As a consequence, the photo-orientable material of the first regions of the orientable layer cannot be reoriented from the second orientation direction to the first orientation direction by the first linear polarized UV light.

In a similar manner, since the retardation of the polycarbonate substrate of Comparative Example 4 is too high (100 nm) under a +45 degree angle between A1 and A2 (see Table 1), the first linear polarized UV light directed from the first side of the polycarbonate substrate to the second side of the polycarbonate substrate is undesirably converted into a non-linear polarized UV light after passing through the polycarbonate substrate. As a consequence, the photo-orientable material of the first regions of the orientable layer cannot be reoriented from the second orientation direction to the first orientation direction by the first linear polarized UV light.

From the foregoing results, it is desirable in the orientation of the photo-orientable material of the first regions 301 of the orientable layer 30 that when the slow axis of the first light-transmissible substrate 10 forms an angle of zero degree or 90 degrees with the polarization direction of the first linear polarized UV light 401, the first light-transmissible substrate 10 needs to have a retardation less than 300 nm, and when the slow axis of the first light-transmissible substrate 10 forms an angle of 45 degrees with the polarization direction of the first linear polarized UV light 401, the first light-transmissible substrate 10 needs to have a retardation less than 100 nm.

Example 9

The operating procedures and conditions of Example 9 were similar to those of Example 1 except for the composition of the patterned light-shielding layer. In Example 9, the weight ratio of the UV absorbing agent to the binder is equal to 1:37.5 for forming the ink material.

Example 10

The operating procedures and conditions of Example 10 were similar to those of Example 1 except for the composition of the patterned light-shielding layer. In Example 10, the weight ratio of the UV absorbing agent to the binder is equal to 1:50 for forming the ink material.

Example 11

The operating procedures and conditions of Example 11 were similar to those of Example 1 except for the preparation of the patterned light-shielding layer. In Example 11, the patterned light-shielding layer was formed by depositing a chromium layer on the polycarbonate substrate, followed by laser ablation to remove a portion of the chromium layer so as to form a hole pattern in the chromium layer.

The light transmissibility of the light-shielding layer and the alignment direction (s) of each of the phase difference films of Examples 9 to 11 aligned by the alignment layer were measured by the use of the phase retardation analyzer (catalogue no.: KOBRA-CCD, manufactured by Oji Scientific Instruments). The alignment results are shown in Table 2.

TABLE 2

|  | Weight ratio of the UV absorbing agent to the binder | Light transmissibility of the light-shielding layer | Number of alignment direction(s) of the phase difference film |
|---|---|---|---|
| Example 1 | 1:25.0 | 10% | 2 |
| Example 9 | 1:37.5 | 15% | 2 |
| Example 10 | 1:50.0 | 20% | 2 |
| Example 11 | — | 0% | 2 |

Example 12

The operating procedures and conditions of Example 12 were similar to those of Example 1 except for the preparation of the patterned light-shielding layer. In addition, the phase difference film thus formed was transferred from the alignment layer on the polycarbonate substrate to a cellulose triacetate substrate through a pressure sensitive adhesive so as to form a phase difference layered structure and a substrate layered structure separated from the phase difference layered structure. The phase difference layered structure included the phase difference film, the pressure sensitive adhesive layer and the cellulose triacetate substrate. The substrate layered structure included the polycarbonate substrate and the alignment layer. In Example 12, 1 g of a black ink (purchased from Taipolo Technology Co., Taiwan) was printed by gravure printing techniques on a polycarbonate substrate (having a thickness of 60 µm, a birefringence of $2.17 \times 10^{-4}$ and a retardation of 13 nm) to form an ink material layer having a layer thickness of about 2 µm, followed by baking in an oven for 30 seconds so as to form the light-shielding layer having a light transmissibility of less than 1%.

Example 13

The operating procedures and conditions of Example 13 were similar to those of Example 12 except for the birefringence of the polycarbonate substrate. The polycarbonate substrate of Example 13 has a birefringence ($\Delta n$) of $4.5 \times 10^{-3}$ and a retardation ($R_0$) of 270 nm.

Example 14

The operating procedures and conditions of Example 14 were similar to those of Example 12 except for the irradiating order of the first and second linear polarized UV lights and the irradiation dosage of the first linear polarized UV light. In Example 14, the second linear polarized UV light is first directed from the second side to the first side of the polycarbonate substrate in an irradiation dosage of 90 mJ/cm$^2$, followed by transmitting the first linear polarized UV light from the first side to the second side of the polycarbonate substrate in an irradiation dosage of 90 mJ/cm$^2$.

Examples 15 to 22

The operating procedures and conditions of Examples 15 to 22 were similar to those of Examples 1 to 8, respectively, except that the light-shielding layer was removed by a solvent, such as toluene, from the polycarbonate after formation of the phase difference film.

With the inclusion of the orientable layer 30 of the photo-orientable material and the irradiation of the photo-orientable material with the first and second linear polarized UV lights 401, 402 in the method of this invention, the phase difference film 52 aligned in two different orientation directions can be easily formed. Moreover, since the light-shielding layer 20 is formed on the first light-transmissible substrate 10, the light scattering problem resulting from the use of the hard masks in the aforementioned conventional method can be eliminated and the use a parallel light source is no longer needed. As such, the manufacturing costs of the phase difference film 52 of this invention can be considerably decreased. Furthermore, the phase difference film 52 formed on the alignment layer 32 can be easily transferred to a thin flexible substrate through a pressure sensitive adhesive so as to achieve the purposes of manufacturing flexible, lighter and thinner devices, such as 3D displays.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:
1. A method of making a phase difference film, comprising:
(a) providing a first light-transmissible substrate having opposite first and second surfaces, the first surface being formed with a patterned light-shielding layer thereon, the second surface being formed with an orientable layer of a photo-orientable material thereon;
(b) providing a first linear polarized UV light that is directed from one side of the first light-transmissible substrate, at which the patterned light-shielding layer is disposed, through the first light-transmissible substrate to an opposite side of the first light-transmissible substrate, at which the orientable layer is disposed, to irradiate the orientable layer and providing a second linear polarized UV light that is directed from said opposite side of the first light-transmissible substrate to said one side of the first light-transmissible substrate to irradiate the orientable layer so as to form the orientable layer into an alignment layer having first and second regions that are photo-oriented in two different orientation directions, respectively; and (c) coating a liquid crystal material on the alignment layer and curing the liquid crystal material so as to form the liquid crystal material into a phase difference film having first and second regions that are aligned in the first and second orientation directions, respectively, wherein the irradiation of the orientable layer with the first linear polarized UV light in step (b) is conducted before the irradiation of the orientable layer with the second linear polarized UV light and the irradiation dosage of the first linear polarized UV light in step (b) is higher than that of the second linear polarized UV light.

2. A method of making a phase difference film, comprising:

(a) providing a first light-transmissible substrate having opposite first and second surfaces, the first surface being formed with a patterned light-shielding layer thereon, the second surface being formed with an orientable layer of a photo-orientable material thereon;

(b) providing a first linear polarized UV light that is directed from one side of the first light-transmissible substrate, at which the patterned light-shielding layer is disposed, through the first light-transmissible substrate to an opposite side of the first light-transmissible substrate, at which the orientable layer is disposed, to irradiate the orientable layer and providing a second linear polarized UV light that is directed from said opposite side of the first light-transmissible substrate to said one side of the first light-transmissible substrate to irradiate the orientable layer so as to form the orientable layer into an alignment layer having first and second regions that are photo-oriented in two different orientation directions, respectively; and (c) coating a liquid crystal material on the alignment layer and curing the liquid crystal material so as to form the liquid crystal material into a phase difference firm having first and second regions that are aligned in the first and second orientation directions, respectively, wherein the irradiation of the orientable layer with the second linear polarized UV light in step (b) is conducted before the irradiation of the orientable layer with the first linear polarized UV light and the irradiation dosage of the first linear polarized UV light in step (b) is not smaller than that of the second linear polarized UV light.

3. The method of claim 1, wherein the first light-transmissible substrate is made from a material selected from polyester resin, acetic ester resin, polyethersulfone resin, polycarbonate resin, polyamide resin, polyimide resin, polyolefin resin, acrylic resin, poly vinyl chloride resin, polystyrene resin, polyvinyl alcohol resin, polyaromatic ester resin, polyphenylene sulfide resin, polyvinylidene chloride resin, and methylacrylic resin.

4. The method of claim 1, wherein the first light-transmissible substrate is made from cellulose triacetate or polycarbonate resin.

5. The method of claim 1, wherein when a slow axis of the first light-transmissible substrate forms an angle of zero degree or 90 degrees with a polarization direction of the first linear polarized UV light, the first light-transmissible substrate has a retardation less than 300 nm.

6. The method of claim 1, wherein when a slow axis of the first light-transmissible substrate forms an angle of 45 degrees with a polarization direction of the first linear polarized UV light, the first light-transmissible substrate has a retardation less than 100 nm.

7. The method of claim 1, wherein the patterned light-shielding layer is made from a material containing a UV radiation absorbing agent and a light-shielding ink.

8. The method of claim 1, wherein the first linear polarized UV light has a first polarizing direction, the second linear polarized UV light having a second polarizing direction perpendicular to the first polarizing direction.

9. The method of claim 1, further comprising transferring the phase difference film from the first light-transmissible substrate to a second light-transmissible substrate after step (c).

10. The method of claim 9, wherein the second light-transmissible substrate is made from a material selected from polyester resin, acetic ester resin, polyethersulfone resin, polycarbonate resin, polyamide resin, polyimide resin, polyolefin resin, acrylic resin, polyvinyl chloride resin, polystyrene resin, polyvinyl alcohol resin, polyaromatic ester resin, polyphenylene sulfide resin, polyvinylidene chloride resin, and methylacrylic resin.

11. The method of claim 9, wherein the second light-transmissible substrate is made from cellulose triacetate or polycarbonate resin.

12. The method of claim 1, further comprising removing the patterned light-shielding layer from the first light-transmissible substrate after step (c).

13. The method of claim 1, further comprising removing the patterned light-shielding layer from the first light-transmissible substrate after step (b).

14. A phase difference layered structure made by the method of claim 9, wherein the phase difference film transferred from the first light-transmissible substrate is attached to the second light-transmissible substrate through a pressure sensitive adhesive layer.

15. The method of claim 2, wherein when a slow axis of the first light-transmissible substrate forms an angle of zero degree or 90 degrees with a polarization direction of the first linear polarized UV light, the first light-transmissible substrate has a retardation less than 300 nm.

16. The method of claim 2, wherein when a slow axis of the first light-transmissible substrate forms an angle of 45 degrees with a polarization direction of the first linear polarized UV light, the first light-transmissible substrate has a retardation less than 100 nm.

17. The method of claim 2, wherein the patterned light-shielding layer is made from a material containing a UV radiation absorbing agent and a light-shielding ink.

18. The method of claim 2, wherein the first linear polarized UV light has a first polarizing direction, the second linear polarized UV light having a second polarizing direction.

* * * * *